Jan. 28, 1969      C. K. MAUER      3,423,997

TESTING DEVICE FOR HOSE CLAMPS

Filed Dec. 30, 1966

INVENTOR.

CHARLES K. MAUER

BY

ATTORNEY

United States Patent Office 3,423,997
Patented Jan. 28, 1969

3,423,997
TESTING DEVICE FOR HOSE CLAMPS
Charles K. Mauer, Baltimore County, Md., assignor to Murray Corporation, Baltimore County, Md., a corporation of Maine
Filed Dec. 30, 1966, Ser. No. 606,207
U.S. Cl. 73—95                          3 Claims
Int. Cl. G01n 3/08

ABSTRACT OF THE DISCLOSURE

A gauge for measuring the tensile strength of hose clamps consisting of a split ring of resilient material having a gap at one side and a force measuring instrument mounted on the ring adjacent the gap, the hose clamp to be tested surrounding the split ring and contracting the same as the hose clamp is tightened, the force measuring instrument indicating the tensile strength to which the hose clamp is subjected in contracting the split ring.

---

Figure 1:
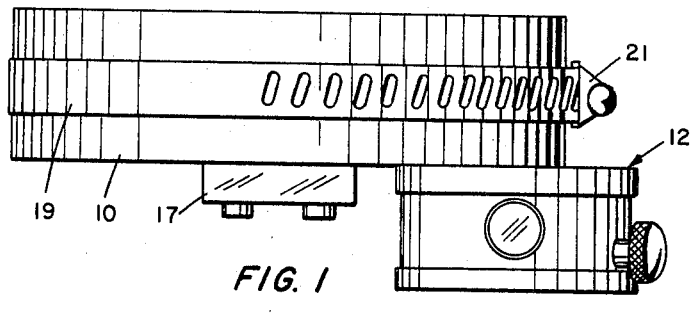

A gauge apparatus for testing the tensile strength of hose clamps which utilizes a split ring element deformable by the hose clamp mounted therearound and a measuring device to measure the deformation in the ring as a factor of the tension in the hose clamp.

It is one object of this invention to produce a gauge apparatus of the type above set out which is simple in construction with a minimum of parts.

It is a further object to produce a gauge which is small in size and is therefore readily portable and yet possesses a relatively high degree of accuracy.

It is a still further object to produce a gauge which will test hose clamps under substantially the same conditions of stress as when the clamps are in actual use in clamping a hose to a pipe nipple.

The above and other objects and advantages of the invention together with its novel construction and arrangement of parts will become more apparent as this description proceeds and for this purpose reference is had to the accompanying drawing, forming a part of this specification, in which like reference characters are used to designate like or similar parts.

Figures 2, 3:
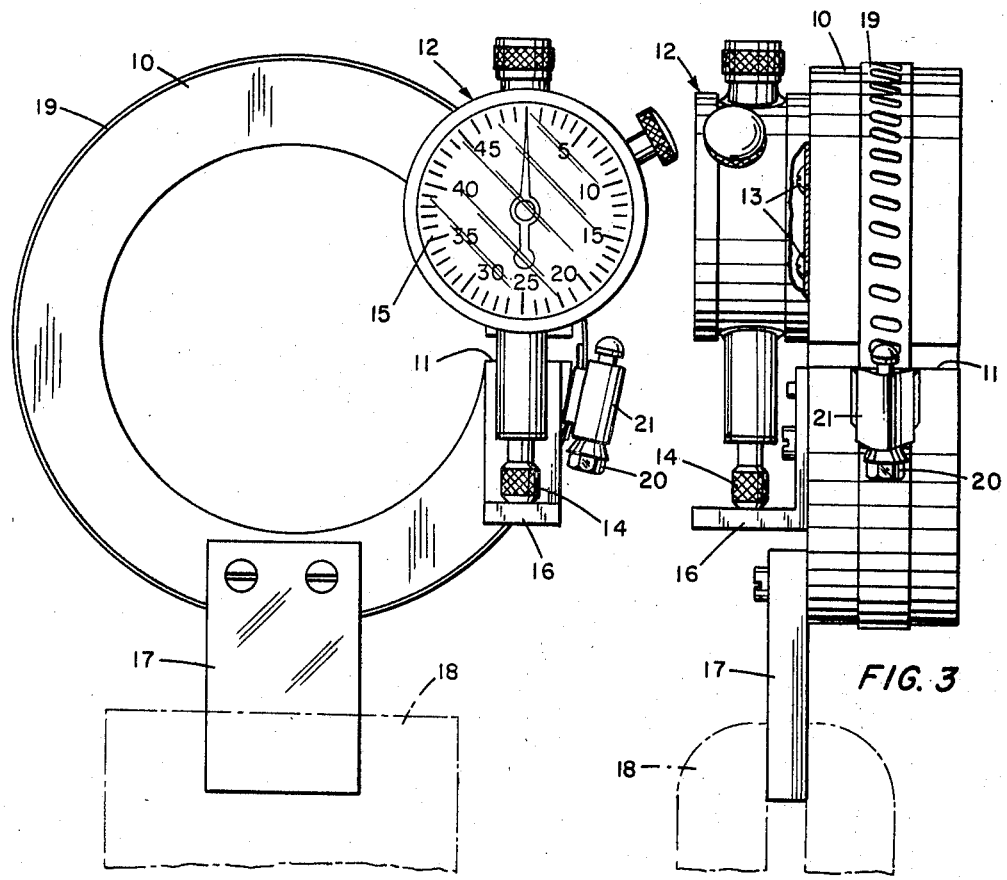

In the drawing:
FIGURE 1 is a top plan view of a split ring gauge according to my invention,
FIGURE 2 is a front elevational view, and
FIGURE 3 is a side elevational view thereof.

In a preferred from the gauge consists of a relatively heavy metal ring 10 with a small section removed at one side and forming a gap indicated at 11. In other words, the ring 10 is in reality a split ring by reason of the gap.

In the vicinity of the gap 11 a conventional type dial indicator 12 is mounted. The indicator is fixed to the split ring at one side of the gap by means such as screws 13 or any equivalent fastening means as shown in FIGURE 3. The indicator is provided with a probe 14 and pressure applied to said probe will be registered on dial 15 thereof.

A pusher block 16 is fixed to the split ring on the opposite side of the gap from the indicator and is positioned to abut the probe of the indicator.

Although not essential in all cases, it has been found preferable to mount the dial indicator 12 and the pusher block 16 on the split ring 10 equidistant from the gap 11.

It is evident that any force applied to the split ring 10 tending to close the gap 11 will cause the block 16 to press the probe of the indicator causing the latter to register the deflection on the split ring.

A mounting block 17 attached to the split ring at any convenient point which will not interfere with the deflection of the ring is provided to form a convenient means for supporting the gauge, such as for example, by clamping the same in the jaws of a vise as shown in phantom at 18 in FIGURES 2 and 3.

Reference numeral 19 indicates a hose clamp mounted on the gauge in position to be tested. It is believed clear that as the hose clamp is drawn up by means of the screw 20 the split ring will be deflected and its deflection will be registered on the dial indicator.

In practice each gauge is calibrated and a chart made from the calibration. Thus when a contracting force is applied to the split ring 10, as by a hose clamp mounted thereon under test, a reading is taken from the indicator and the resultant force in tension in the hose clamp may then be found on the chart from the reading taken.

It should be particularly noted that as the hose clamp is tightened its inner diameter decreases at substantially the same rate as the external diameter of the split ring decreases thus minimizing slippage between the ring and clamp with the result that more accurate determination of the strength of the clamps tested may be obtained.

Having thus described a preferred embodiment of my invention I wish it understood that I do not desire to be limited specifically thereto but only to the extent required by the prior art and as defined in the appended claims.

I claim:
1. A gauge for measuring the tensile strength of circular hose clamps comprising,
   (a) a circular ring element of resilient deformable material,
   (b) an open gap through said ring element at one side thereof to render the same resiliently contractible when subjected to squeezing forces,
   (c) means on said ring element to receive a hose clamp to be tested directly thereon,
   (d) an indicator means mounted on said ring element registering contracting force applied to said ring to close the gap therein, whereby a hose clamp mounted on said means and contracted will cause resiliently resisted contraction of the ring element and cause the indicator means to register.
2. The structure defined in claim 1 in which the means on the ring element to receive the hose clamp comprises an outer cylindrical surface on the ring element on which the hose clamp may be directly placed.
3. The structure defined in claim 1 in which the indicator means comprises a force indicating element and a probe extending thereform, and the mounting for the indicator means on the ring element comprises a fixed attachment for the indicator element on the ring element adjacent one side of the gap therein and an abutment on the ring element adjacent the other side of the gap in contact with said probe.

References Cited
UNITED STATES PATENTS

| | | | |
|---|---|---|---|
| 2,009,406 | 7/1935 | Longley | 73—88 |
| 2,833,145 | 5/1958 | McCullough. | |
| 3,167,953 | 2/1965 | Dillon | 73—141 |
| 3,228,237 | 1/1966 | Newton | 73—88 |
| 3,286,512 | 11/1966 | Jagger et al. | 73—88 |

RICHARD C. QUEISSER, *Primary Examiner.*
JAMES H. WILLIAMSON, *Assistant Examiner.*

U.S. Cl. X.R.
73—143